(12) United States Patent
Qi et al.

(10) Patent No.: US 8,017,248 B2
(45) Date of Patent: *Sep. 13, 2011

(54) FUSER MEMBER HAVING FLUORINATED POLYIMIDE OUTER LAYER

(75) Inventors: Yu Qi, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/244,986

(22) Filed: Oct. 3, 2008

(65) Prior Publication Data

US 2010/0086772 A1  Apr. 8, 2010

(51) Int. Cl.
*B32B 5/00* (2006.01)
(52) U.S. Cl. .......... 428/473; 428/334; 428/336
(58) Field of Classification Search .......... 428/473.5, 428/334, 336
See application file for complete search history.

(56) References Cited

U.S. PATENT DOCUMENTS 5,945,223 A  8/1999  Kuntz et al.

FOREIGN PATENT DOCUMENTS

| JP | 05-249705 | * | 9/1993 |
| JP | 06-122886 | * | 5/1994 |

* cited by examiner

*Primary Examiner* — D. Lawrence Tarazano
*Assistant Examiner* — Gregory Clark
(74) *Attorney, Agent, or Firm* — MH2 Technology Law Group LLP

(57) ABSTRACT

A fuser member having a substrate, and thereover, an outer layer including a fluorinated polyimide, and an image forming apparatus including the fuser member, and the fuser member may useful in oil-less fusing systems, and wherein the fluorinated polyimide has the following Formula I

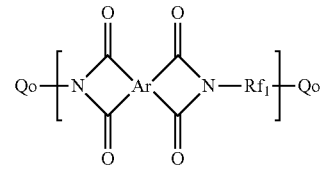

wherein Ar represents a fluorinated hydrocarbon group; $Rf_1$ represents a fluorine-containing group and Q is a end group, n is a number of from about 20 to about 1,000 carbons, and o is 0 or 1.

17 Claims, 2 Drawing Sheets

FUSER MEMBER HAVING FLUORINATED POLYIMIDE OUTER LAYER

CROSS REFERENCE TO RELATED APPLICATIONS

Attention is directed to commonly assigned U.S. application Ser. No. 12/245,289, filed Oct. 3, 2008, entitled "Fuser Member Having Fluorinated Polyimide Outer Layer." The subject matter of this application is hereby incorporated by reference in its entirety.

BACKGROUND

The disclosure herein relates generally to an imaging apparatus and fuser components thereof for use in electrostatographic, including digital, image-on-image, and like apparatuses. The fuser members are useful for many purposes including fixing a toner image to a copy substrate. More specifically, the disclosure relates to fuser components comprising an outer layer comprising a fluorinated polyimide. In embodiments, the fluorinated polyimide is crosslinked. In embodiments, the fluorinated polyimide comprises an aromatic segment and a fluorinated aliphatic segment. In embodiments, the fluorinated polyimide outer layer is positioned on a substrate, which may be of many configurations including a roller, belt, film, or like substrate. In embodiments, there is positioned between the substrate and the outer layer, an intermediate and/or adhesive layer. In embodiments, the fusing system is oil-less, thereby not requiring a release oil, release agent, fuser oil, or the like. The fuser members may be useful in xerographic machines, such as copiers, printers, facsimiles, multifunction machines, and including color machines.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known and methods include providing the application of heat and pressure substantially concurrently by various means: a roll pair maintained in pressure contact, a belt member in pressure contact with a roll, a belt member in pressure contact with a heater, and the like. Heat may be applied by heating one or both of the rolls, plate members, or belt members. With a fixing apparatus using a thin film in pressure contact with a heater, the electric power consumption is small, and the warming-up period is significantly reduced or eliminated.

It is desired in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser, and accordingly it is desired to provide a fusing surface, which has a low surface energy to provide the necessary release. To ensure and maintain good release properties of the fuser, it has become customary to apply release agents to the fuser roll during the fusing operation. Typically, these materials are applied as thin films of, for example, silicone oils to prevent toner offset.

Another method for reducing offset, is to impart antistatic and/or field assisted toner transfer properties to the fuser. However, to control the electrical conductivity of the release layer, the conformability and low surface energy properties of the release layer are often affected.

With a focus on oil-less fusing, energy-efficiency, and fast warm-up time (e.g., inductive heated fuser), belt fusing configuration and reliability/productivity is currently achieved by increased fuser belt size and additional system approaches. There are only a few material solutions that meet the current high demands for fusing, especially for oil-less fusing. Two major material choices include PFA/PTFE for oil-less fusing, and VITON-GF® (DuPont) fluoroelastomers used in combination with oil systems for high end production. Addition of fillers to improve mechanical properties and thermal conductivity is a general trend for life improvement.

PFA represents a type of fluroplastic, which currently is the only material choice for oil-less fusing. However, the downside to using this material includes a resulting mechanically rigid material that is easily damaged by denting or from extensive turning. Also, PFA is difficult to process and there is limited room for material modification. Also, PFA requires high curing temperatures if known coating methods are used.

Turning to VITON®, this material is one of the most popular fluoroelastomers for fusing, as it is mechanically flexible, and less damage results due to its capability to absorb shock energy. The material requires low curing temperatures, and has wide material modification latitude. However, this fluoroelastomer requires oil for release due to the low fluorine content of the material.

While the above polymers have desirable properties such as thermal and chemical stability and low surface-energy, fuser members using these materials continue to fail at shorter times than is desirable, primarily due to wear and poor release at the surface (offset).

A new material system for fusing is desired that exhibits improved wear and release properties without requiring the addition of a release fluid (oil-free). In addition, there is a desire to provide an outer layer fusing material that is tunable to enable superior fusing performance with less system parts, and that requires less time for manufacture.

SUMMARY

Embodiments include a fuser member comprising a substrate, and thereover, an outer layer comprising a fluorinated polyimide comprising the following Formula I:

wherein Ar represents a fluorinated hydrocarbon group and $Rf_1$ represents a fluorine-containing group and Q represents an end group, o is 0 or 1, and n is an integer ranging from about 20 to about 1000.

In addition, embodiments include an image forming apparatus for forming images on a recording medium comprising a charge-retentive surface to receive an electrostatic latent image thereon; a development component to apply toner to the charge-retentive surface to develop an electrostatic latent image to form a developed image on the charge retentive surface; a transfer component to transfer the developed image from the charge retentive surface to a copy substrate; and an oil-less fuser member for fusing toner images to a surface of the copy substrate, wherein the oil-less fuser member does not require the presence of a fuser oil for release, the oil-less fuser member comprising a substrate, and thereover, an outer layer comprising a fluorinated polyimide comprising the following Formula I wherein Ar represents a fluorinated hydrocarbon group; $Rf_1$ represents a fluorine-containing group and Q is a end group, n is a number of from about 20 to about 1,000 carbons, and o is 0 or 1.

BRIEF DESCRIPTION OF THE DRAWINGS

The above embodiments will become apparent as the following description proceeds upon reference to the drawings, which include the following figures.

DETAILED DESCRIPTION

Fluorinated polyimides are high performance polymers that offer chemical and thermal stability, and enable oil-less fusing. Relatively high fluorinated polyimides are high performance polymers, which offer chemical and thermal stability, in embodiments, and can enable oil-less fusing. Tunable mechanical, physical and/or chemical properties may be achieved by adjusting the component ratio of the relatively stiff aromatic segment and relatively soft fluorinated aliphatic segment. Reactive sites may be introduced to accommodate the site for curing and/or crosslinking. The polyimide can be prepared by known reactions, namely polycondensation between aromatic dianhydrides and diamines. By properly tailoring the structure, the resulting polyimide can possess the desired properties potentially for oil-less fusing applications.

Figure 1:
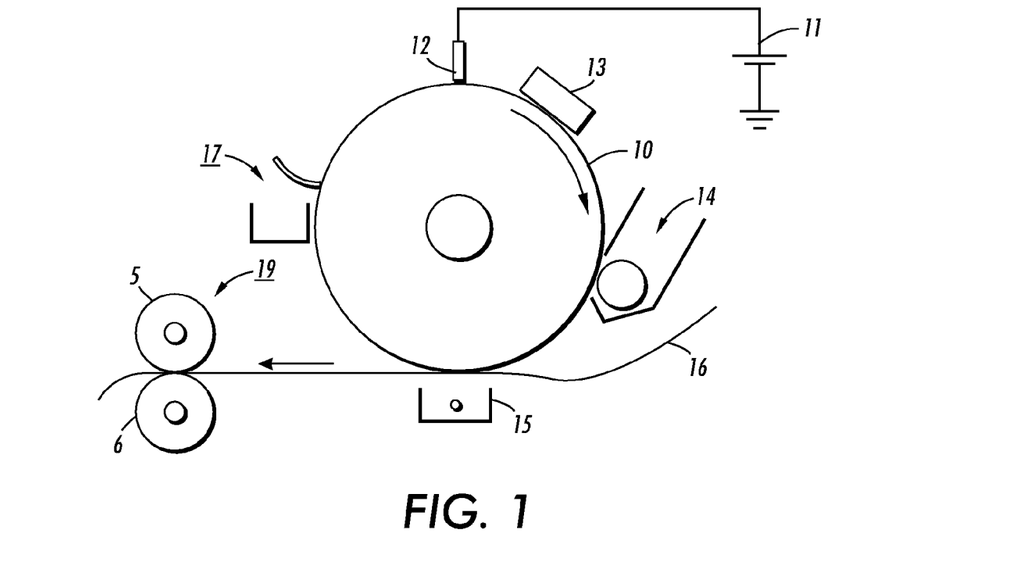
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 5 and pressure member 6, thereby forming a permanent image. Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
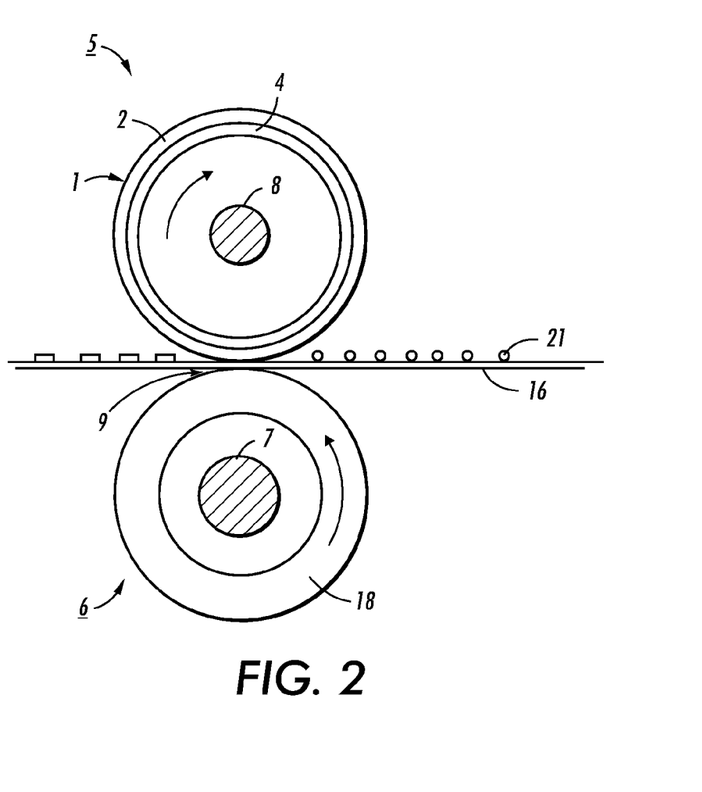
FIG. 2 is a sectional view of a fusing assembly in accordance with one embodiment disclosed herein.

In FIG. 2, fuser roller 5 can be a hollow cylinder or core fabricated from any suitable metal, such as aluminum, anodized aluminum, steel, nickel, copper, and the like, having a suitable heating element 8 disposed in the hollow portion thereof which is coextensive with the cylinder.

Backup or pressure roll 6 cooperates with fuser roll 5 to form a nip or contact arc 9 through which a copy paper or other substrate 16 passes such that toner images 21 thereon contact surface 2 of fuser roll 5. As shown in FIG. 2, the backup roll 6 has a rigid steel core 7 with a surface or layer 18 thereon.

In embodiments, the fuser system is oil-less and there is no release agent needed for fusing. No oil is applied to the fuser roller, and the release agent delivery rollers are not present in the system. However, in other embodiments, the system could possibly use a release agent.

The fusing component can be comprised of at least three different configurations. In one embodiment, the fusing component is of a two-layer configuration as shown in FIG. 2. Fuser member 5 having heating element 8, comprises substrate 4. Positioned over the substrate 4 is outer layer 2.

Figure 3:
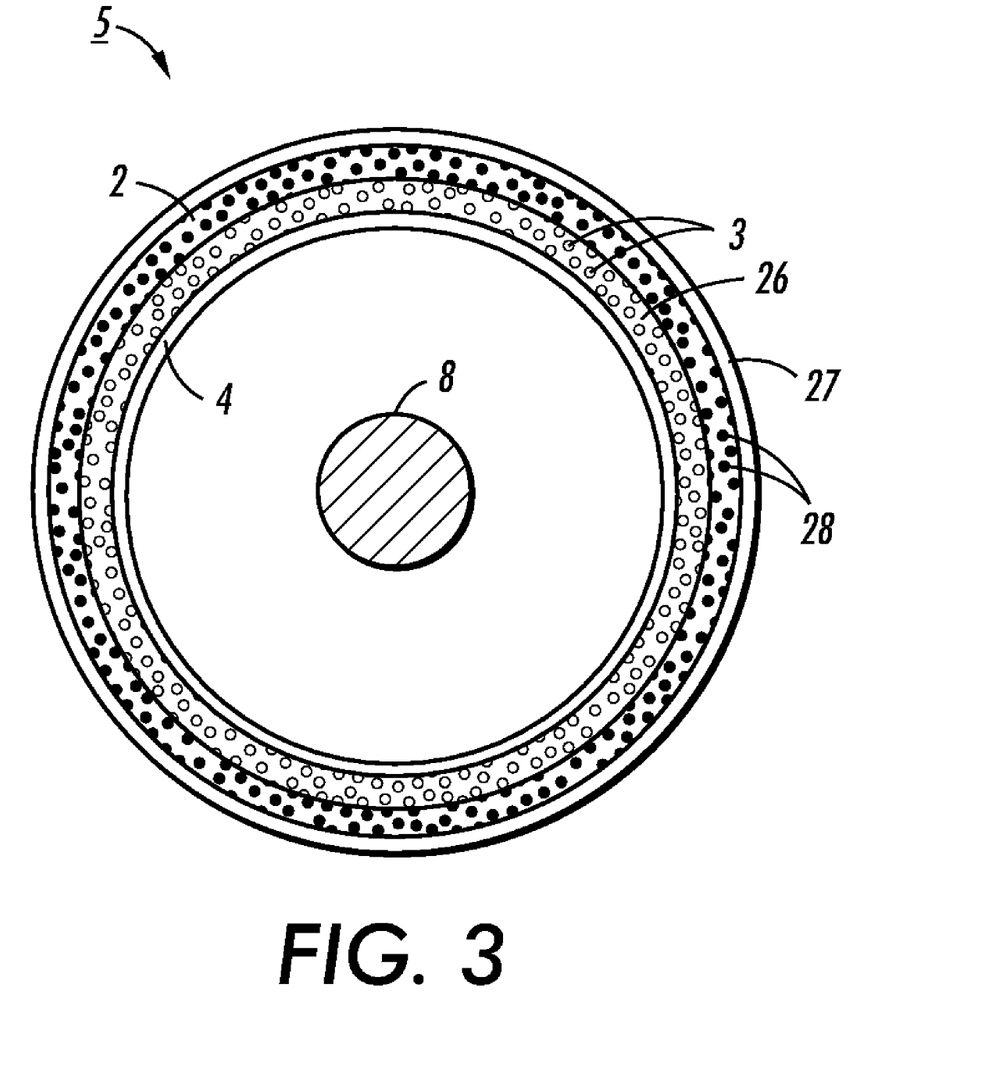
FIG. 3 is a sectional view of an embodiment of a fuser roller having a three-layer configuration.

FIG. 3 demonstrates a three-layer configuration, wherein fuser roller 5 has heating member 8 inside, and thereover substrate 4 and having intermediate layer 26 positioned on substrate 4, and outer layer 2 positioned on intermediate layer 26. FIG. 3 demonstrates optional fillers 3 and 28, which may be the same or different, and can be dispersed optionally in the intermediate layer 26, and/or optionally in the outer layer 2. There may be provided none, one, or more than one type of filler(s) in the layer(s).

In embodiments, there may be present an outer release layer 27 positioned on the outer layer 2 as shown in FIG. 3. However, in embodiments, there is no outer release layer.

Examples of suitable substrate materials include, in the case of roller substrate, metals such as aluminum, stainless steel, steel, nickel and the like. In the case of film-type substrates (in the event the substrate is a fuser belt, film, drelt (a cross between a drum and a belt) or the like) suitable substrates include high temperature plastics that are suitable for allowing a high operating temperature (i.e., greater than about 80° C., or greater than 200° C.), and capable of exhibiting high mechanical strength.

The outer layer comprises a fluorinated polyimide. More specific examples of fluorinated polyimides include the following general formulas:

and wherein Ar represents a fluorinated hydrocarbon group of from about 6 to about 60 carbons, or from about 6 to about 20 carbons; $Rf_1$, $Rf_2$ and $Rf_3$ individually represents a fluorine-containing group, L represents a linkage group, l and m each individually represent a mole fraction of repeating units, wherein the value ranges from about 0.1 to about 0.99, n and p individually represent an integer ranging from about 20 to about 1000, or from about 30 to about 800, or from about 50 to about 500; and Q represents an end group, and o is 0 or 1. In embodiments, Ar represents an aromatic group, and $Rf_1$, $Rf_2$ and $Rf_3$ represent an aliphatic group.

In embodiments, Ar represents a fluoroalkyl or fluoralkylether substituent groups such as $-CF_3$, $-CF_2(CF_2)_mCF_3$, $-(CF_2CF_2O)_mCF_3$ and the like, wherein m is a number of from 0 to about 100, or from about 1 to about 80, and Ar comprises aromatic groups such as pyromellitic, naphthalic moieties. Ar can represent a fluoroalkyl having from about 6 to about 60 carbons, or from about 6 to about 40 carbons.

$Rf_1$, $Rf_2$ and $Rf_3$, in embodiments, can have the formula $R_1$ or $-R_1-D-R_2-$ or $R_2$ wherein $R_1$ comprises a fluorinated aliphatic group such as vinylidene fluoride, tetrafluoroethylene, hexafluoropropylene, perfluoro(methyl vinyl ether), perfluoro(ethyl vinyl ether), perfluoro(propyl vinyl ether) and mixtures thereof, and $R_2$ may comprise aryl groups. Rf may further contain a divalent group D connected to the fluorinated group, such as, in embodiments, a divalent hydrocarbon group represented by $-C_xH_{2x}-$, $-C_xH_{2x-2}-$, $-C_xH_{2x-4}-$ (x is an integer from about 1 to about 15, or from about 2 to about 10), $-CH_2-C_6H_4-$ or $-C_6H_4-C_6H_4-$, an oxycarbonyl group ($-COO-$), an amide group ($-CONH-$), a thio group ($-S-$), an oxy group ($-O-$), an isocyano group ($-N=CH-O$), a carbonyl group a sulphonyl group combinations thereof, or a divalent group in which two or more such groups are combined. The divalent group may have a substituent group such as an alkyl group, a phenyl group, an alkoxyl group or an amino group on its side chain.

Illustrative examples of $R_1$ include perfluoroether segments such as $CH_2-(CF_2)_x-CH_2$, $-(C_nF_{2n}O)_x-$, $-CH_2CF_2O(C_nF_{2n}O)_xCF_2CH_2-$, $-CH_2CH_2OCH_2CF_2O(C_nF_{2n}O)_xCF_2CH_2OCH_2CH_2-$, and mixtures thereof, wherein $C_nF_{2n}$ is a linear or branched perfluorocarbon chain, n is a number of from about 1 to about 6, or from about 1 to about 5, and x is a number of repeating units of from about 1 to about 500, or from about 1 to about 300, or from about 1 to about 100.

In embodiments, $R_1$ comprises a perfluoropolyether component selected from the group consisting of poly(difluoromethylene oxide), poly(tetrafluoroethylene oxide), poly(hexafluoropropylene oxide), poly(tetrafluoroethylene oxide-co-difluoromethylene oxide), poly(hexafluoropropylene oxide-co-difluoromethylene oxide), and poly(tetrafluoroethylene oxide-co-hexafluoropropylene oxide-co-difluoromethylene oxide).

In embodiments, $R_1$ comprises a random or block copolymer selected from the group consisting of:

and mixtures thereof, wherein i, j, and k each represent a number ranging from 0 to about 200, of from about 1 to about 100, and wherein the total of i+j+k ranges from about 3 to about 500, or from about 5 to about 250.

$R_1$ may also comprise a monomeric repeat unit selected from the group consisting of vinylidene fluoride, tetrafluoroethylene, hexafluoropropylene, perfluoro(methyl vinyl ether), perfluoro(ethyl vinyl ether), perfluoro(propyl vinyl ether), and mixtures thereof.

Examples of aromatic Ar, and $R_2$ groups include aromatic moieties, and the aromatic moieties may include a fluorine atom. Examples include the following moieties and mixtures thereof, wherein Rf' and Rf in the above anhydrides represents the point of attachment of the fluorinated aliphatic group such as those listed above, for example, a fluorine atom or a fluorinated alkyl group of from about 1 to about 100, or from about 2 to about 50, or from about 3 to about 25 carbons, and wherein R is a linkage group such as, for example, a hexafluoromethylisopropylidene group a thio group (—S—), an oxy group (—O—), an isocyano group (—N=CH—O—), a carbonyl group a sulphonyl group a divalent group in which two or more such groups are combined.

Examples of divalent linkage L include an amide group an ether group (—O—), a urethane group (—N=CH—O—), a thio group (—S—), an ester group a carbonate group and a divalent group in which two or more such groups are combined.

Such fluorinated polyimides can be prepared by reacting a dianhydride with a diamine as shown in Scheme 1 as follows:

wherein, in Scheme 1, n is a number of from about 20 to about 1000, or from about 30 to about 800, or from about 50 to about 500, Rf can be $R_1$ or $R_1$-D-$R_2$, and wherein $R_1$ comprises a fluorinated aliphatic group such as vinylidene fluoride, tetrafluoroethylene, hexafluoropropylene, perfluoro(methyl vinyl ether), perfluoro(ethyl vinyl ether), perfluoro(propyl vinyl ether) and mixtures thereof and $R_2$ may comprise aryl groups. Rf may further contain a divalent group D connected to the fluorinated group, such as, in embodiments, a divalent hydrocarbon group represented by —$C_xH_{2x}$—, —$C_xH_{2x-2}$—, —$C_xH_{2x-4}$— (x is an integer of from about 1 to about 15, or an integer of from about 2 to about 10), —$CH_2$—$C_6H_4$— or —$C_6H_4$—$C_6H_4$—, an oxycarbonyl group (—COO—), an amide group (—CONH—), a thio group (—S—), an oxy group (—O—), an isocyano group (—N=CH—O), a carbonyl group a sulphonyl group combinations thereof, or a divalent group in which two or more such groups are combined. The divalent group may have a substituent group such as an alkyl group, a phenyl group, an alkoxyl group or an amino group on its side chain. Element "n" represents the number of the repeating units of the segment in the polymer, and wherein n is from about 20 to about 1000, from about 30 to about 800, or from about 50 to about 500.

Specific examples of Ar include dianhydrides such as

Ar can also be a diamine, and specific examples of diamines include and mixtures thereof, wherein Rf and Rf' in the above anhydrides represents fluorine, a fluorinated alkyl group, for example, —$CF_3$, —$CF_2(CF_2)_m CF_3$, —$(CF_2CF_2O)_m CF_3$, wherein m is a number of from about 0 to about 100, or from about 1 to about 50, or from about 1 to about 20; R is a linkage group such as, for example, a hexafluoromethylisopropylidene group a thio group (—S—), an oxy group (—O—), an isocyano group (—N=CH—O—), a carbonyl group a sulphonyl group a urethane group, and combinations thereof, or a divalent group in which two or more such groups are combined, L is a divalent linkage such as, for example, an oxycarbonyl group (—COO—), an amide group (—CONH—), a thio group (—S—), an oxy group (—O—), an isocyano group (—N═CH—O—), a carbonyl group a sulphonyl group a urethane group, and combinations thereof, and $R_1$ is as described above.

Examples of divalent linkage L include an amide group an ether group (—O—), a urethane group (—N═CH—O—), a thio group (—S—), an ester group a carbonate group a divalent group in which two or more such groups are combined.

A reactive group can be introduced for further crosslinking of the polyimide by end cap with a monoamino or a monoanhydride compound containing a reactive functionality (Q) in the generic formulas:

wherein Q is selected from a group consisting of and mixtures thereof.

In embodiments, the fluorinated polyimide may have the following formulas:

wherein x is a number of from about 1 to about 100, or from about 2 to about 50; p, n, and m are the number of repeating unit ranging from about 10 to about 1,000, or from about 10 to about 500, or from about 20 to about 500, or from about 20 to about 400.

A filler may be present in the outer layer. The filler may be a metal such as copper, alumina or the like or mixtures thereof; metal oxide such as magnesium oxide, manganese oxide, alumina, copper oxide, titania, silica, other inorganic fillers such as boron nitride, silica carbide, mica, or like oxides or mixtures thereof; carbon filler such as carbon black, graphite, fluorinated carbon black, or the like or mixtures thereof; polymer filler such as polytetrafluoroethylene, polyaniline, or other like polymer filler or mixtures thereof; or other like filler or mixtures thereof. The filler is present in the outer layer composition in an amount of from about 3 to about 50 percent, or from about 5 to about 30 percent, or from about 10 to about 20 percent by weight of total solids.

In embodiments, the outer fluorinated polyimide layer is crosslinked. Examples of suitable crosslinking agents include free radical initiators such as azo type (AIBN), peroxides (BPO), biphenol such as hydroquinone, a bisphenol such as bisphenol A (2,2-bis(4-hydroxyphenyl)propane) or bisphenol AF (2,2-bis(4-hydroxyphenyl)hexafluoropropane, in commercial formulations such as VC50 from Dupont), an aminosilane such as AO700 (aminoethyl aminopropyl trimethoxysilane crosslinker from Gelest), a diamine such as hexamethylenediamine, and a masked diamine such as N,N'-dicinnamylidene-1,6-hexanediamine. A "masked" diamine refers to the coordination of functional groups to amine functionalities. In embodiments, a fluoropolymer is dissolved in a solvent and a crosslinking agent is added along with other components that enable crosslinking.

The crosslinked fluorinated polyimide can be prepared by reacting the dianhydride monomer and the diamine monomer in a polar aprotic organic solvent such as NMP. The polymerization can be done in a one-step process or a two-step process via a poly(amic acid) (PAA). The solution soluble polyimides can be processed in the imide form. However, the insoluble polyimides have to be processed in the poly(amic acid) form. The poly(amic acid) film can be cast from the solution, which can be converted to polyimide by heating. Further heating when radical initiators are present leads to crosslink the polyimide film.

The outer material composition can be coated on the substrate in any suitable known manner. Typical techniques for coating such materials on the reinforcing member include liquid flow-coating, dip coating, wire wound rod coating, fluidized bed coating, powder coating, electrostatic spraying, sonic spraying, blade coating, and the like. In an embodiment, the fluorinated polyimide material coating is flow coated to the substrate. Details of the flow coating procedure can be found in U.S. Pat. No. 5,945,223, the disclosure of which is hereby incorporated by reference in its entirety.

The outer layer is coated to a thickness of from about 5 to about 100 microns, or from about 20 to about 40 microns, or from about 15 to about 25 microns.

In an embodiment, the outer layer may be modified by any known technique such as sanding, polishing, grinding, blasting, coating, or the like. In embodiments, the outer fluorinated polyimide layer has a surface roughness of from about 0.02 to about 1.5 micrometers, or from about 0.3 to about 0.8 micrometers.

In embodiments, an intermediate layer can be positioned between the substrate and outer layer. In other embodiments, an outer release layer can be positioned on the outer layer, or the fuser member can be oil-less—not requiring a release agent or fuser oil for suitable release.

Examples of suitable intermediate layers or suitable optional outer release layers include silicone rubber, fluoropolymer, urethane, acrylic, titamer, ceramer, hydrofluoroelastomer, polymers, (such as polymers, copolymers, terpolymers and the like) or mixtures thereof, and fillers such as carbon black and/or aluminum oxide. In embodiments, the intermediate layer comprises a silicone rubber.

The optional intermediate layer and/or optional outer release layer can be coated to the outer layer using any known, suitable technique. In an embodiment, the additional layers can be spray or flow coated.

The intermediate layer can have a thickness of from about 2 to about 10 mm, or from about 3 to about 9 mm, or from about 5 to about 8 mm.

The outer release layer, in optional embodiments, can be coated on the outer layer to a thickness of from about 1 to about 50 um, or from about 5 to about 30 um. The outer release layer can be any of the polymer coatings described above for use as the intermediate layer.

The fusing component can be of any suitable configuration. Examples of suitable configurations include a sheet, a film, a web, a foil, a strip, a coil, a cylinder, a drum, a roller, an endless strip, a circular disc, a belt including an endless belt, an endless seamed flexible belt, an endless seamless flexible belt, an endless belt having a puzzle cut seam, and the like. In an embodiment, the fuser member is a fuser roller. In embodiments, the substrate of the fuser roller is metal, such as aluminum or steel. In embodiments, the substrate is a fuser belt.

Optionally, any known and available suitable adhesive layer may be positioned between the outer layer and the substrate, and/or between the outer layer and the outer release layer. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 to about 10 percent solution can be wiped on the substrate. The adhesive layer can be coated on the substrate, or on the outer layer, to a thickness of from about 2 to about 2,000 nanometers, or from about 2 to about 500 nanometers.

The adhesive can be coated by any suitable, known technique, including spray coating or wiping.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The following Examples are intended to illustrate and not limit the scope herein. Parts and percentages are by weight unless otherwise indicated.

EXAMPLES

Example 1

Synthesis of Fluorinated Polyimide-I wherein n and m are molar fractions of each component, wherein n is a number of from about 0.01 to 0.99, m is a number of from about 0.99 to 0.01, and n+m=1.

The dianhydride, the diamine and poly(tetrafluoroethylene oxide-co-difluoromethylene oxide)a,w-dicarboxylic acid monomers are polymerized in m-cresol with a small amount of isoquinoline as the catalyst at high temperature (200° C.). The resulting polymer solution is precipitated in methanol. The polymer is washed in methanol twice by dissolving and precipitation and dried at 100° C. for 12 hours.

Example 2

Synthesis of Fluorinated Polyimide-II

The dianhydride and the diamine monomers are polymerized in m-cresol at a relatively high temperature (200° C.) with a small amount of isoquinoline as the catalyst. The resulting polymer solution is precipitated in methanol. The polymer is washed in methanol twice by dissolving and precipitation and dried at 100° C. for 12 hours.

Example 3

Formation of Fuser Member Coating

A fuser member coating formulation is prepared by dissolving the fluorinated polyimide-I in an organic solvent (e.g. methylisobutylketone). The resulting solution is coated on a fuser roll by flow coating technique, which is prior coated with silicone rubber layer.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A fuser member comprising a substrate, and thereover, an outer layer comprising a fluorinated polyimide comprising the following Formula I wherein Ar represents a fluorinated hydrocarbon group; $Rf_1$ represents a fluorine-containing group and Q is a end group, n is a number of from about 20 to about 1,000 carbons, and o is 0 or 1, and wherein Ar comprises an aromatic group of from about 6 to about 60 carbons, and wherein $Rf_1$ comprises a fluorine-containing aliphatic group.

2. The fuser member of claim 1, wherein Ar comprises a substituent group selected from the group consisting of —$CF_3$, —$CF_2(CF2)_mCF_3$, and —$(CF_2CF_2O)_mCF3$, wherein m is a number of from about 1 to about 100.

3. The fuser member of claim 1, wherein $Rf_1$ is selected from the group consisting of —$R_1$— and —$R_1$-D-$R_2$—, wherein $R_1$ and $R_2$ are each comprises a fluorinated hydrocarbon groups, and D represents a divalent linkage group.

4. The fuser member of claim 3, wherein $R_1$ is an aliphatic group selected from the group consisting of $CH_2$—$(CF_2)_x$—$CH_2$, —$(C_nF_{2n}O)_x$—, —$CH_2CF_2O(C_nF_{2n}O)_xCF_2CH_2$—, —$CH_2CH_2OCH_2CF_2O(C_nF_{2n}O)_xCF_2CH_2OCH_2CH_2$—, and mixtures thereof, wherein n is a number of from about 1 to about 6, and x is a number of repeating units of from about 1 to about 500.

5. The fuser member of claim 3, wherein $R_1$ is an aliphatic group selected from a group consisting of and mixtures thereof, wherein i, j, and k are each represent a number ranging from 0 to about 200, and wherein the total of i+j+k is ranging from about 3 to about 500.

6. The fuser member of claim 3, wherein $R_2$ is an aromatic moiety selected from the group consisting of and mixtures thereof, wherein Rf' and Rf are selected from the group consisting of a fluorine atom and a fluorinated alkyl group of from about 1 to about 100 carbons, and wherein R is a linkage group selected from the group consisting of hexafluoromethylisopropylidene, a thio group, an oxy group, an isocyano group, a carbonyl group, and a sulphonyl group.

7. The fuser member of claim 6, wherein $R_2$ is selected from the group consisting of wherein Rf is selected from the group consisting of a fluorine atom and a fluorinated alkyl group of from about 1 to about 100 carbons; and L is a divalent linkage group selected from the group consisting of an oxycarbonyl group, an amide group, a thio group, an oxy group, an urethane group, a carbonyl group, a sulphonyl group, and combinations thereof.

8. The fuser member of claim 3, wherein D is a divalent linkage group selected from the group consisting of an oxycarbonyl group, an amide group, a thio group, an oxy group, an urethane group, a carbonyl group, and a sulphonyl group.

9. The fuser member of claim 1, wherein Ar is selected from the group consisting of wherein Rf' is selected from the group consisting of a fluorine atom and a fluorinated alkyl group of from about 1 to about 100 carbons, and wherein R is a linkage group selected from the group consisting of a hexafluoromethylisopropylidene group, a thio group, an oxy group, an urethane group, a carbonyl group, a sulphonyl group, and combinations thereof.

10. The fuser member of claim 1, wherein said end group Q comprises a reactive group that reacts on heating.

11. The fuser member of claim 1, wherein Q is selected from the group consisting of and mixtures thereof.

12. The fuser member of claim 1, wherein said fluorinated polyimide has the following formula and mixtures thereof, wherein x is a number of from about 1 to about 100; p is the number of repeating unit ranging from 10 to 500.

13. The fuser member of claim 1, wherein said outer layer has a thickness of from about 5 to about 100 microns.

14. The fuser member of claim 1, wherein said fluorinated polyimide is crosslinked.

15. The fuser member of claim 1, wherein said outer layer further comprises a filler.

16. The fuser member of claim 1, wherein said substrate, is in the form of a belt.

17. An image forming apparatus for forming images on a recording medium comprising a charge-retentive surface to receive an electrostatic latent image thereon; a development component to apply toner to the charge-retentive surface to develop an electrostatic latent image to form a developed image on the charge retentive surface; a transfer component to transfer the developed image from the charge retentive surface to a copy substrate; and an oil-less fuser member for fusing toner images to a surface of the copy substrate, wherein said oil-less fuser member does not require the presence of a fuser oil for release, said oil-less fuser member comprising a substrate, and thereover, an outer layer comprising a fluorinated polyimide comprising the following Formula I wherein Ar represents a fluorinated hydrocarbon group; $Rf_1$ represents a fluorine-containing group and Q is a end group, n is a number of from about 20 to about 1,000 carbons, and o is 0 or 1.

* * * * *